United States Patent [19]
Wert

[11] Patent Number: 5,528,672
[45] Date of Patent: Jun. 18, 1996

[54] TELEPHONE SYSTEM WITH SUBSCRIBER SELECTED AUDIO AND IMAGE ANNOUNCEMENTS

[75] Inventor: Gerald M. Wert, New Providence, N.J.

[73] Assignee: AT&T Corp., Murray Hill, N.J.

[21] Appl. No.: 175,092

[22] Filed: Dec. 29, 1993

[51] Int. Cl.$^6$ .......................... H04M 11/00; H04M 1/64; H04M 3/42

[52] U.S. Cl. ................... 379/96; 379/94; 379/88; 379/207; 379/97

[58] Field of Search ................... 379/93, 96, 94, 379/97, 98, 143, 144, 154, 155, 100, 207, 88, 89; 348/13–15

[56] References Cited

U.S. PATENT DOCUMENTS

| | | | |
|---|---|---|---|
| 4,797,914 | 1/1989 | Vaello | 379/155 |
| 4,805,119 | 2/1989 | Maeda et al. | 379/96 |
| 4,827,500 | 5/1989 | Binkerd et al. | 379/207 |
| 4,996,707 | 2/1991 | O'Malley et al. | 379/100 |
| 5,218,633 | 6/1993 | Clagett et al. | 379/96 |
| 5,257,306 | 10/1993 | Watanabe | 348/15 |

Primary Examiner—Jason Chan

[57] ABSTRACT

A telephone network system routes audio and image announcements into a call originating from a local telephone station of a calling party. A subscriber may select desired audio and image announcements that are generated by a network announcement facility which is operatively connected to the telephone switch system. The network announcement assembly generate audio and image announcements into the calls that are switched into the network announcement facility. The routing manager located at a customer subscriber location is interfaced with the network control point for determining the routing logic of the call to the switch as a function of factors such as location of the calling party and the time of day. The routing manager also includes an interface with the network announcement assembly so that the subscriber can generate audio and image announcements and transfer the announcements to the network announcement facility via a separate data path. A subscriber may select the desired audio and image announcements to be switched into the call originated from the calling party based on different parameters, such as the location of the calling party, the time of day and other economic or demographic factors.

14 Claims, 3 Drawing Sheets

TELEPHONE SYSTEM WITH SUBSCRIBER SELECTED AUDIO AND IMAGE ANNOUNCEMENTS

FIELD OF THE INVENTION

This invention relates to a telephone network system for switching subscriber selected audio and image announcements into a call originating from a local telephone station of a calling party.

BACKGROUND OF THE INVENTION

Telephone network carriers offer business subscribers the use of toll-free 800 services. Typically, the toll-free 800 telephone number is associated with the business customer and any calls placed to that 800 number are directed to one of a number of customer associated locations based on factors such as the time of day or the geographical location of the caller.

A caller who dials a toll-free 800 number comes into the telephone network from the local telephone exchange company serving that calling area. The local telephone exchange then forwards the telephone call to the network originating switch, which queries the network control point. The network control point then gives the switch the internal routing number based on the subscriber's logic developed in its routing manager.

Before the call is routed to the subscriber, the network control point may instruct the call to be switched into a network services announcement facility such as a network services complex (NSCX) where an announcement is played. Once the announcement is played, the subscriber's routing logic plan dictates the call routing through the network switch system.

With the increased competition in the telephone industry, customers that subscribe to 800 toll-free services desire greater control over calls made in the toll-free 800 numbers. Most subscribers now desire more than simple access into the routing control system to set up routing logic within the telephone network. Customers also desire an interface with the processors and announcement banks that store and play announcements such as the NSCX facility. With the advent of audio and image transmissions, subscribers desire not only the ability to control routing logic through their routing manager, but also desire the ability to control announcements from their routing managers. These announcements may include images for use with telephones that include video displays, such as the ATT Public Phone 2000.

SUMMARY OF THE INVENTION

It is therefore an object of the present invention to allow a telephone network subscriber to control the selection of announcements such as from an NSCX facility.

It is another object of the present invention to access the announcement facility in a telephone network system from a subscriber location for selecting announcements to be played.

An advance in the art of processing telephone calls is achieved in accordance with the present invention by a telephone network system which includes the capability for switching audio and image announcements into a call originating from a local telephone station of a calling party through the means of a routing manager located at a subscriber location.

In accordance with the present invention, the telephone network system includes a switch for forwarding a call made from a calling party to a telephone network customer subscriber of services such as the toll-free 800 service. Network control means is associated with the switch for controlling the routing of the call through the network. The network control means includes a database storing routing information of the subscriber. The logic is accessed via switch generated queries. The network control means includes a routing control system and further includes an interface means for communicating between the customer routing means and the network control system. The interface can comprise a dial-up, dial-back standard voice line capable of handling 4.8 to 9.6 Kbits of data transmission. The interface means can also comprise a dedicated access line for use with packet data.

Customer routing means in the form of a routing manager is located at the subscriber premises. It is interfaced with the network control means. The subscriber programs the routing manager to determine the routing logic of the call through the switch means as a function of factors such as the location of the calling party and the time of day.

Network announcement means, such as an NSCX facility, is operatively associated with the switch means for generating audio and image announcements into a call that has been switched into the NSCX facility. The routing manager includes an announcement manager means for accessing the network announcement facility and transmitting subscriber selected audio and image announcements to the network announcement facility. In accordance with the present invention, a subscriber may thus select a desired audio or image announcement that is sent to a calling party via the network announcement facility.

In one aspect of the present invention, the audio and image announcements are prerecorded at the location of the customer subscriber, then transferred and stored at the network announcement facility. In another aspect of the invention, the audio and image announcements are prerecorded and stored at the premises location of the customer subscriber. Selected announcements can be delivered to the network announcement facility on a real time basis for transmission to the calling party.

In still another aspect of the invention, the network announcement facility includes means for receiving text that is input from the customer/subscriber. The text is then merged into speech for delivery to a calling party.

In a call, the network announcement facility can be prompted for delivering audio and image announcements by the generation of a touch tone sequence from the calling party. The selected announcements can be a function of the calling party's location.

DESCRIPTION OF THE DRAWINGS

The foregoing and other objects and advantages of the present invention will be appreciated more fully from the following description, with reference to the accompanying drawings in which.

DETAILED DESCRIPTION OF THE INVENTION

Figure 1:
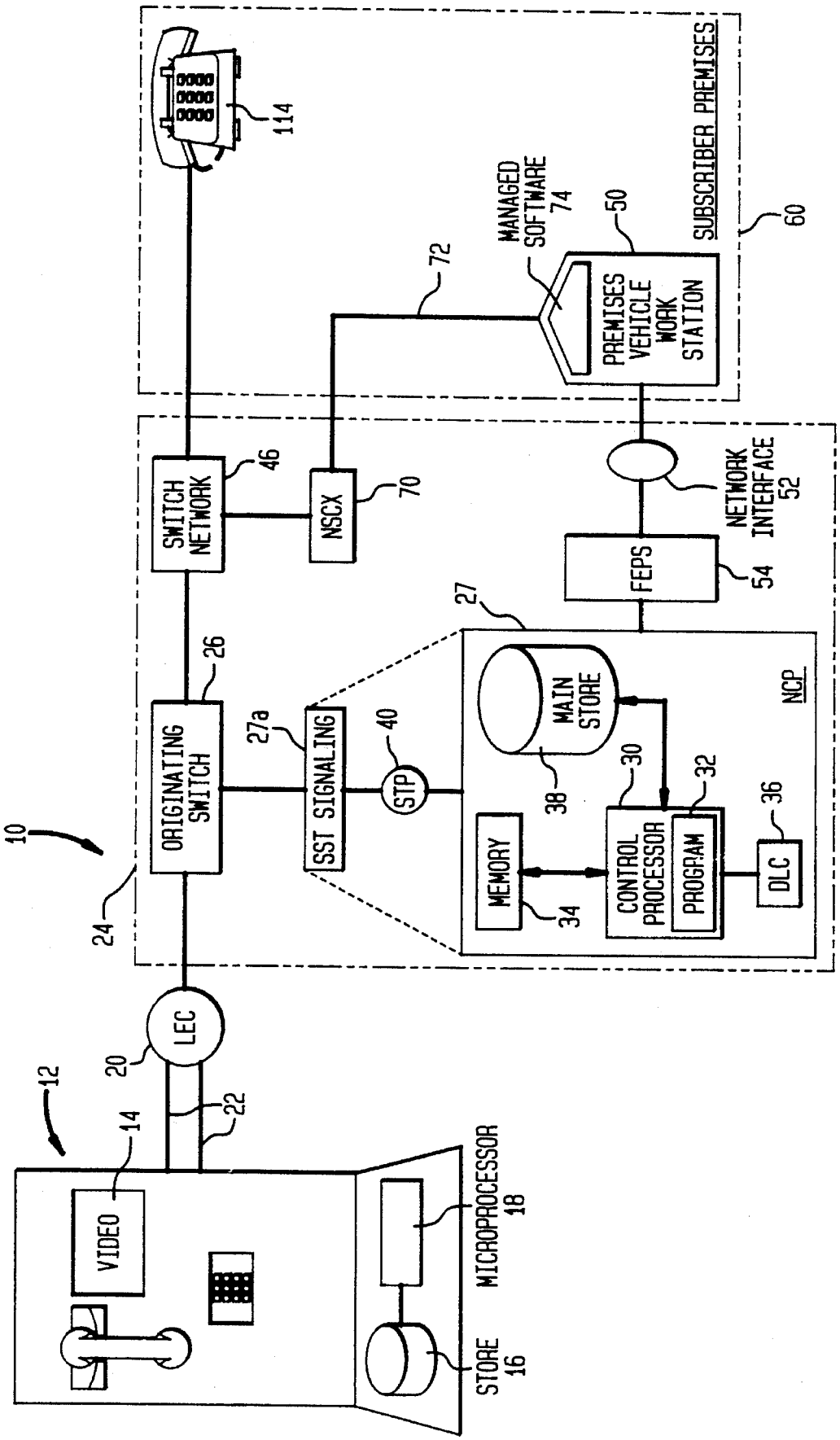
FIG. 1 is a block diagram of the telephone network system that switches selected audio and image announcements into a call originating from a local telephone station of a calling party.

Referring now to FIG. 1, there is shown a block diagram of the system, illustrated generally at 10, in accordance with the present invention, which switches audio and image announcements into a call originating from a local telephone station of a calling party. The benefits of the present invention not only provide a system vehicle for requesting information through an announcement facility, but also gives subscriber selected announcement information, such as audio and visual data to a calling party. The subscriber may use its premises vehicle, known as the routing manager, not only to determine routing logic, but also to manage announcements by an interface to the network announcement facility (NSCX).

Although the foregoing description will set forth a description of the generation of audio announcements by the NSCX facility, the system of the present invention can be used with video images also stored in the NSCX facility. These images would be displayed on a phone, indicated generally at 12, having a video monitor 14. Subscribers not only desire to control audio announcements, but they also desire to control video images which can be stored on an announcement frame. More phones are presently being installed which incorporate display monitors. An example of this type of phone which may be used includes the ATT Public Phone 2000. (The Phone 2000). The Phone 2000 has a high resolution, nine inch color monitor that displays both graphics and text with 640×480 pixels, 256 VGA color capability. The phone includes its own data storage module 16 and microprocessor 18 for controlling the operation of the phone ancillaries as well as the video monitor 18.

For clarity of understanding, the general operation of the switching network and 800 number routing through the network is first explained, followed by the description of the network announcement facility and the system of the present invention. Reference should be made to the flow chart of FIG. 3 which shows basic flow of the telephone call through the network switch system to an announcement facility where announcements to be played. Throughout the description, the steps in the flowchart of FIG. 3 will be referred to as blocks of the numerical sequence starting with the number 100.

Figure 3:
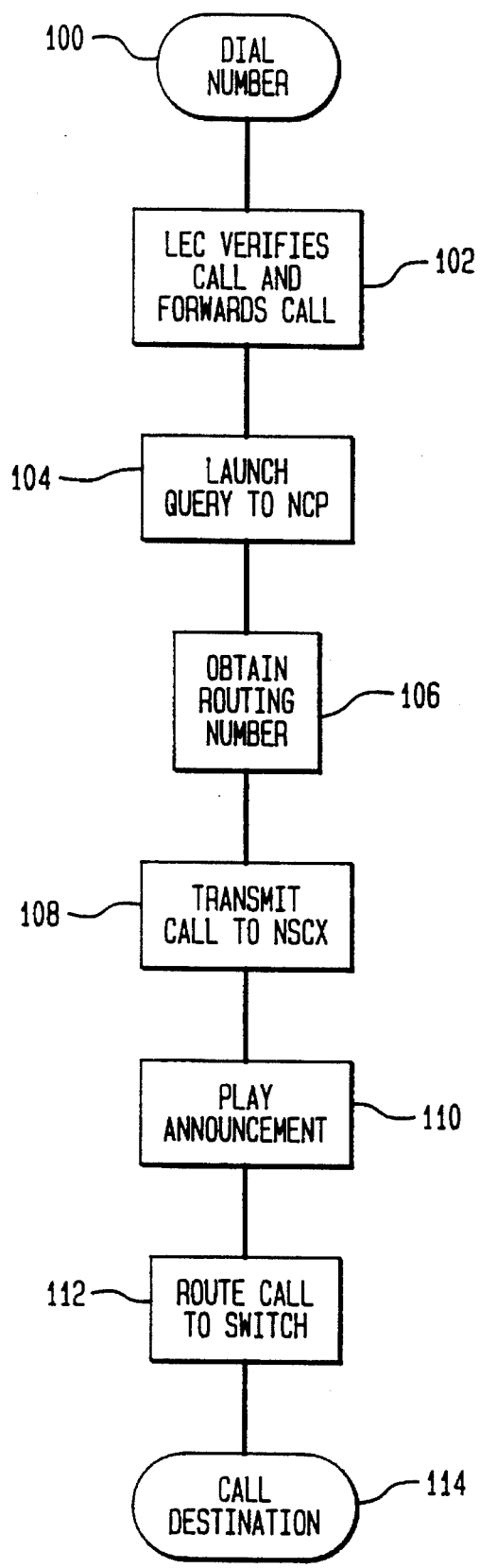
FIG. 3 is a flow chart depicting the three methods for managing announcements from the subscriber premises.

As shown in FIG. 1 and the flowchart of FIG. 3, the subscribers client, (hereafter referred to as calling party) initially picks up the phone 12. The local exchange company (LEC) via a local exchange switch 20, returns a dial tone to complete the local loop via two local lines 22 to the local phone. The calling party then dials a subscriber's toll-free 800 number (Block 100), and the call is transmitted to the local exchange switch 20 (which may be a 5ESS® electronic switching system available from AT&T). The local exchange company having control of the switch 20 will verify the 800 number and the network to which the 800 number belongs, and then forward the call to the proper network (indicated by the dashed lines 24) (Block 102) which in the illustrated and described embodiment is an AT&T network that services calls made to that number (hereinafter referred to as "the network").

The call is transferred to an "originating" switch 26 (which may be a 4ESS° electronic switching system available from AT&T). That switch 26 takes the call and signals back to the local operating company 20 that is has received the call and to maintain the circuit open for voice transmission. At this time, the originating switch 26 plays back to the customer the tones for the on-line sound. During the screening process, the originating switch 26 launches a query to a network control point 27 which as those skilled in the art are aware, is a centralized data base and part of the SS7 signaling system 27a also referred to as the conventional common channel signalling network (Block 104). The network control point 27 stores the appropriate Inward Wide-Area Telecommunications Service (INWATS) database. The INWATS database (IDB) is used to perform a 10-digit 800 to POTS number translation.

The query typically will include information concerning the dialed number and information identifying the calling party's location, such as an automatic number identification (ANI) for the line serving that location. This query is typically made in the form of a data message transmitted to the NCP via a signalling link.

The network control point includes a control processor 30 which operates under the control of a program 32 stored in memory 34 and a data link controller (DLC) 36, which operates to transmit and receive data messages to and from toll switches via a signal transfer point 40.

The signal transfer points 40 are very high capacity, reliable packet switches that transport signalling messages between network modes such as switches and network control points. They perform routing functions and terminate a large number of signalling links performing protocol processing and routing of a high volume of messages through the links.

The network control point 27 also includes a main data storage unit 38 which could be a number of memory disk units. This unit contains translation data that is used to translate a telephone number accompanying a request message into a primary destination code. This destination code could be the address of the destination toll switch or telephone number identifying the called station. If the destination code is a telephone number, then a toll switch in conventional manner translates the telephone number into an address i.e., routing number, identifying the destination toll switch.

The network control point 27 retrieves or "executes" the subscriber record associated with the received dial number, in order to obtain a routing number used to direct the originating switch 26 where it should route the call through the switched network 46 (Block 106). This routing number could be sensitive to call origination locations. As explained in detail below, the subscriber can formulate a routing plan whereby, calls from customers in one region to the subscriber's 800 number are routed to a first service center in that region, while calls from customers in another region to the same 800 number are routed to a second service center in another geographic location.

The routing number may also contain a code that can be interpreted by the switch as providing multiple, sequential routing choices. Thus, when the originating switch receives a code, it can retrieve a table containing information defining the first choice routing. The table also could contain information defining a second choice routing in the event the first choice is busy, out of service, or otherwise unavailable. The table may include information defining additional routing choices. This is particularly advantageous to provide backup capability in the event that a particular network element is temporarily inoperative.

In accordance with the present invention, the network subscriber has a premises vehicle 50 associated with a network interface 52 of a routing control system 54, part of the network control point 27. The premises vehicle 50 allows a subscriber to go into the network 24 and make changes to their routing logic. In the described embodiment, the routing manager is a software application that sits presently on a work station such as a "Sun Spark Work Station" situated at the subscriber's location indicated by the dotted lines The work station could be any Unix software based work station capable of running a platform manager such as the AT&T platform manager which is a Sun windows based platform.

The software program has the capability of allowing customers to design their routing logic and formulate the routing logic into executable commands that would be executed in the network. The routing manager is interfaced with the routing control system 54 of the network. The routing control system includes control processors which are termed "front end processors" (FEPS). These processors are interfaced with the network database of the network control point 27. An employee at the subscriber premises can create new routing logic by incorporating changes in the database 38 to describe the routing scenario for a call when the NCP 27 is queried.

Two routing control systems 54 may exist in this network, which in the described embodiment is an ATT network. A user support system (USS) can be used which is a 3B based AT&T processor. Second, a GAS also now referred to as FSSS, Fred User Support System, may be used. This is a pyramid device and the routing manager interfaces into that particular mode.

Two type of interfaces 52 can be used between the work station 50 and routing control system 54. A dial-up or dial-back standard voice POTS line capable of handling 4.82 to 9.6 Kbits transmission, or a dedicated access line using an acunet packet service can be used. This interface is known as an RCS/PC1, which is now called RCS/RMI, the Routing Control Service / Routing Manager Interface.

It is to be noted that the network control point 27 can eventually provide other available features when it is queried. These features include call treatment that is sensitive not only to the location of the calling party as described above, but also to the time of day or week that the call is made.

Additionally, a "call prompter" service may be provided where a calling party is connected to a network services complex (NSCX) 70 as shown in FIG. 1. The network services complex 70 is a processor or number of processors grouped together by a LAN network forming a host complex. This complex 70, also referred to as the "NSCX announcement facility" receives instructions from the network control point 27 to play an announcement stored in its announcement frame. The calling party is connected to and switched to the network services complex which is arranged to interact with the calling party using stored voice scripts so as to play announcements to the calling party and/or collect information from the calling party. This information can then be used for further processing of the call.

In accordance with the present invention, the subscriber now has capabilities to interface with the (NSCX) network services complex 70 or other similar announcement facility used in the network.

As shown in FIG. 1, the subscriber premises vehicle, 50 i.e. work station 70, is linked directly to the network announcement facility by a separate data link 72 which allows digital transmission of audio and video data to the NSCX. Those skilled in the art can choose from several commonly known data interfaces to permit this connection. The routing manager now allows the subscriber to manage the network announcement facility (NSCX) 70. The premises vehicle 50 (work station) now has a managed software program 74 for manipulating announcements of both audio and visual nature and transmitting the announcements data via the interface connection 72 with the host processor of the network announcement facility 70. The premises vehicle 70 is a now able to pool and manage information from an inventory and activate it in the routing control process in the call handling process. For example, when a call is made from a particular geographic location, it may be routed to a certain customer location based on the caller's location and time of day. The NCP may first direct the call to the NSCX 70 based on the desired routing logic of the subscriber (Block 108).

The desired audio announcement (or image if the caller is at a Phone 2000 with monitor) is then played in response to the NCP signal (Block 110). The call is the routed back to the switch 26 (Block 112) and to its proper call destination (Block 114).

Figure 2:
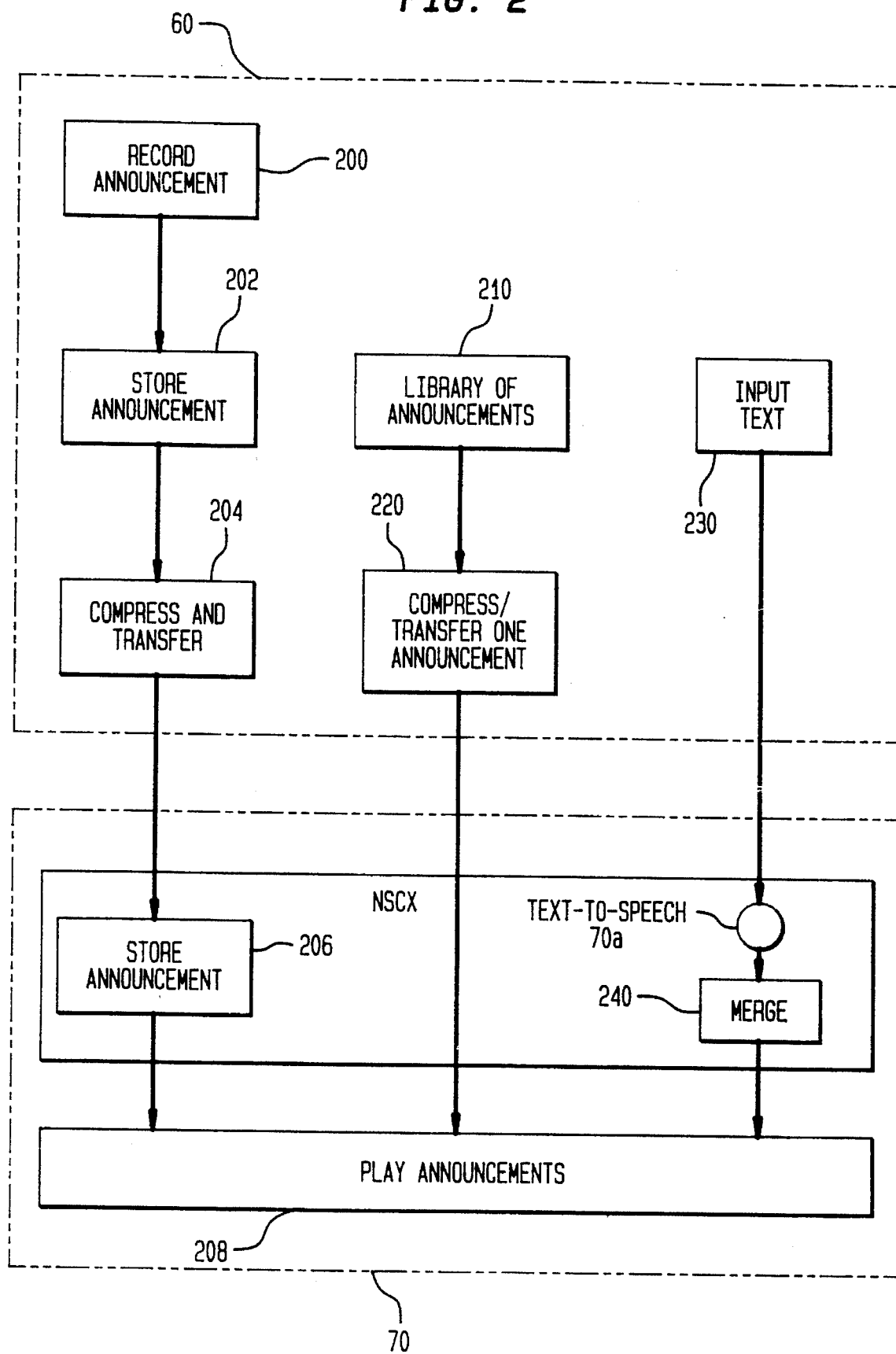
FIG. 2 is a high level flow diagram describing the basic telephone exchange process performed when using the system of FIG. 1.

Three distinct possible management scenarios are desirable. Referring now to FIG. 2, three management functions of the premises vehicle 70 are illustrated.

A subscriber can prerecord audio or image announcements (Block 200) at the subscriber premises 60. These announcements are then stored as data on the premises vehicle 50 (Block 202). This data is then transferred such as by compressing and packetizing the data (Block 204) from the premises vehicle 50 to the network announcement facility 70, where the data packets are rearranged and stored in the announcement host database or plurality of host databases that are linked together (Block 206). The announcements then are drawn from the data base as needed when the NCP directs the call to the network announcement facility. Where the announcement is played (Block 208).

In a second situation, the subscriber location has a library of announcements (Block 210) in their own host premises. The announcements then are transferred 70 on a real time basis to the network announcement facility when the call is routed to the network announcement facility 70 pursuant to instructions based on the query answer received form the NCP. The recording could be done by network AT&T personnel or the subscriber. Typically, the catt announcement could be compressed and packetized data for real time transfer (Block 220).

In a third situation, the subscriber inputs text (Block 230) at the premises vehicle 60. The text is then transferred to the network announcement facility 70. The facility includes a text-to-speech processor 70a. As the original call is switched to the network announcement facility 70 as a result of the query to the NCP 27, the selected text can be merged on a real time basis to speech Block 240.

The present invention provides a convenient handle for the routing manager operator to access the network announcement facility 70 (NSCX), such as invoked by "call prompter" or other announcement modes. Various pre-selected announcements 70 may now be switched into a call. These announcements can be stored locally, stored in the network announcement facility 70 or generated using text-to-speech technology. If calls are made from a Public Phone 2000 or other similar equipment the announcements can be visual in nature and displayed on the video monitor 14 (FIG. 1) and data transferred to the network announcement facility could be compressed into packets, which will be less bandwidth for transmission across the lines. This is especially relevant for image transmission. A video compression chip such as the ATT AVP 4000 video compression chip set could be used.

It is to be understood that the above description is only one preferred embodiment of the invention. Numerous other arrangements may be devised by one skilled in the art without departing from the spirit and scope of the invention.

We claim:

1. A telephone network system for switching audio and image announcements of a network subscriber into a call originating from a local telephone station through a switched network comprising switch means for forwarding the call made from a calling party to the network subscriber, said network subscriber being located at the premises location separate from the switched network, network control means associated with said switch means for controlling the routing of the call through said switch means, network announcement means operatively connected to said switch means for generating the audio and image announcements, and means for switching said call originating from said calling party into said network announcement means for receipt of the audio and image announcements, call routing management means located at the premises location of the network subscriber and interfaced with said network control means for determining routing logic of the call through said switch means as a function of different calling parameters, said call routing management means including, announcement management means associated with said call routing management means, said announcement management means including means for storing said audio and image announcements for transfer at a later time to said network announcement means for storage therein, said announcement management means including means for accessing the network announcement means and transmitting stored said audio and image announcements to said network announcement means, wherein the network subscriber may select the audio and image announcements to be received by the calling party from said network announcement means.

2. The telephone network system according to claim 1 wherein the audio and image announcements are prerecorded at the location of the network subscriber, then transferred and stored at said network announcement means.

3. The telephone network system according to claim 1 wherein the audio and image announcements are prerecorded and stored at the location of the network subscriber, and including means for delivering selected announcements to said network announcement means on a real time basis for transmission to the calling party.

4. The telephone network system according to claim 1 wherein said network announcement means includes means for receiving text that is input from said network subscriber and merging the input text into speech for delivery from said network announcement means to the calling party.

5. The telephone network system according to claim 1 wherein said network announcement means is prompted for delivering the audio and image announcements by the generation of a touch tone sequence from the calling party.

6. The telephone network system according to claim 1 wherein the audio and image announcements transmitted by said network announcement means is a function of the calling party's location.

7. The telephone network system according to claim 1 wherein said network control means includes a routing control system, and further including interface means for communicating between said call routing management means and said routing control system.

8. The telephone network system according to claim 7 wherein said interface means comprises a dial-up, dial-back voice line for handling 4.8 to 9.6 Kbits of data transmission.

9. The telephone network system according to claim 7 wherein said interface means comprises a dedicated access line for use with packet data.

10. A method of routing audio and image announcements to a local telephone station of a calling party comprising the steps of storing within an announcement manager located at a premises location of a network subscriber the audio and image announcements, transferring from the announcement manager said audio and image announcements at a later time to a network announcement facility that is associated with a telephone network switch system for storage therein, forwarding a call made from the local telephone station to the telephone network switch system, determining routing logic of the call within a call routing manager located at the premises location of the network subscriber by querying a network control system and routing the call through the telephone network switch system based on different calling parameters, while switching the call to the network announcement facility while generating to the calling party said audio and image announcements announcement that are preselected by the network subscriber.

11. The method according to claim 10 including the steps of prerecording the audio and image announcements at the location of the network subscriber, transferring the prerecorded announcements to the network announcement facility, and then transmitting the stored announcements into the telephone network switch system and to the calling party.

12. The method according to claim 10 including the steps of prerecording and storing the audio and image announcements at the location of the network subscriber, and then transferring the announcements to the network announcement facility on a real time basis as the call that originates from the local telephone station is switched into the network announcement facility.

13. The method according to claim 10 including the steps of inputting text from the network subscriber, transferring the text to the network announcement facility, and then converting the text to speech and delivering the speech to the calling party.

14. The method according to claim 10 including the steps of prompting the network announcement facility to deliver preselected said audio and image announcements when the calling party generates a preselected touch tone sequence.

* * * * *